United States Patent
Brocard et al.

(10) Patent No.: US 10,309,312 B2
(45) Date of Patent: *Jun. 4, 2019

(54) FUEL METERING DEVICE PROTECTED AGAINST ICING

(71) Applicant: Safran Aircraft Engines, Paris (FR)

(72) Inventors: Jean-Marie Brocard, Moissy-cramayel (FR); Régis Michel Paul Deldalle, Moissy-cramayel (FR); Anne Marie Cécile Barreau, Moissy-cramayel (FR); Pierre Charles Mouton, Moissy-cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/746,227

(22) PCT Filed: Jul. 19, 2016

(86) PCT No.: PCT/FR2016/051848
§ 371 (c)(1),
(2) Date: Jan. 19, 2018

(87) PCT Pub. No.: WO2017/013347
PCT Pub. Date: Jan. 26, 2017

(65) Prior Publication Data
US 2018/0209344 A1    Jul. 26, 2018

Related U.S. Application Data

(63) Continuation-in-part of application No. 14/825,566, filed on Aug. 13, 2015, now Pat. No. 9,777,644.

(30) Foreign Application Priority Data

Jul. 21, 2015  (FR) ..................... 15 56909

(51) Int. Cl.
*G05D 11/00* (2006.01)
*F02C 7/232* (2006.01)
(Continued)

(52) U.S. Cl.
CPC .............. *F02C 7/232* (2013.01); *F02C 7/222* (2013.01); *F02C 7/224* (2013.01); *F02C 7/236* (2013.01);
(Continued)

(58) Field of Classification Search
CPC .......... F02C 7/232; F02C 9/263; F02M 69/18
See application file for complete search history.

(56) References Cited

U.S. PATENT DOCUMENTS 3,465,778 A  9/1969 Kast
4,226,365 A  10/1980 Norris et al.
(Continued)

FOREIGN PATENT DOCUMENTS

FR    2825120 A1    11/2002

OTHER PUBLICATIONS

International Search Report and Written Opinion with English translation dated Nov. 23, 2016 in corresponding International Application No. PCT/FR2016/051848 (14 pages).

*Primary Examiner* — Reinaldo Sanchez-Medina
(74) *Attorney, Agent, or Firm* — Bookoff McAndrews, PLLC (57) ABSTRACT

A fuel metering unit comprising a movable element including at least one fuel flow section opening upstream towards a fuel supply duct and opening downstream towards a utilization duct through a metering slot with a flared profile having a narrow flow section and a wide flow section, the movable element able to be moved with respect to a stationary element between a low flow rate position and a high flow rate position, the metering slot made in the stationary
(Continued)

element or in the movable element and its obstruction obtained by covering the slot with a wall of the movable element or of the stationary element.

17 Claims, 7 Drawing Sheets

(51) Int. Cl.
  *F02C 7/22* (2006.01)
  *F02C 7/224* (2006.01)
  *F02C 7/236* (2006.01)
  *F02C 9/26* (2006.01)
  *F16K 3/26* (2006.01)

(52) U.S. Cl.
  CPC ........ *F02C 9/263* (2013.01); *F05D 2220/323* (2013.01); *F05D 2240/35* (2013.01); *F05D 2250/90* (2013.01); *F05D 2260/607* (2013.01); *F16K 3/26* (2013.01); *Y02T 50/675* (2013.01)

(56) References Cited

U.S. PATENT DOCUMENTS

| | | | |
|---|---|---|---|
| 5,205,537 A | | 4/1993 | Pfeiffer |
| 5,284,020 A | * | 2/1994 | Brocard ............... F02C 7/22 137/118.04 |
| 5,772,182 A | | 6/1998 | Stambaugh, Sr. et al. |
| 5,941,074 A | | 8/1999 | Schultz |
| 5,983,621 A | | 11/1999 | Stambaugh, Sr. et al. |
| 6,782,692 B2 | | 8/2004 | Hodinot et al. |
| 8,511,329 B1 | | 8/2013 | Rickis et al. |
| 9,777,644 B2 | * | 10/2017 | Deldalle .............. F02C 9/263 |
| 2002/0174647 A1 | | 11/2002 | Hodinot et al. |
| 2007/0180813 A1 | | 8/2007 | Pickard et al. |
| 2009/0301575 A1 | | 12/2009 | Arnett |

* cited by examiner

FUEL METERING DEVICE PROTECTED AGAINST ICING

CROSS-REFERENCE TO RELATED APPLICATIONS

This application is the U.S. national phase entry under 35 U.S.C. § 371 of International Application No. PCT/FR2016/051848, filed on Jul. 19, 2016, which claims priority to U.S. patent application Ser. No. 14/825,566 filed on Aug. 13, 2015, now U.S. Pat. No. 9,777,644, and French Patent Application No. 1556909, filed on Jul. 21, 2015, the entireties of each of which are herein incorporated by reference.

BACKGROUND OF THE INVENTION

The present invention relates to the general field of fuel metering units with variable geometrical aperture. It finds a preferential application to fuel metering units fitting out fuel supply circuits of an aircraft engine, and more particularly to circuits delivering fuel for feeding combustion injectors of the engine.

Generally, a fuel supply circuit of an aircraft engine comprises a pumping system consisting of a low pressure pump connected upstream to the fuel tank of the aircraft and associated downstream with a high pressure pump that is driven by the engine via an accessory gearbox (or AGB). Downstream from the high pressure pump, the fuel supply circuit is separated into two branches, one of the branches comprising a bypass control valve and a fuel metering unit allowing regulation of the fuel flow rate feeding the combustion injectors of the engine, and the other branch comprising a heat exchanger and sending the fuel towards variable-geometry actuators of the engine (for example, air discharge valves or control valves for vanes of variable pitch). The excess fuel flow rate generated by the high pressure pump is returned to the inlet of this pump through the bypass control valve, which partially contributes to heating up the circuit, particularly at low speeds of the engine where the recycling rate is maximal.

Such a fuel supply circuit needs to be protected against the risk of icing of the water contained in the fuel. Indeed, the pressure and the temperature encountered during flight may cause water to pass from the liquid state to the solid state and cause malfunctions of the fuel supply circuit.

In conventional architectures of fuel supply circuits, the units that are the most sensitive to icing are supplied with heated fuel at a positive temperature by a heat exchanger. However, when oil is used for heating the fuel, the heat power available in the oil system of the engine makes it possible with a dedicated oil/fuel exchanger to heat the fuel sufficiently only for the low flow rates sent to the variable-geometry actuators of the engine. Indeed, this heat power is not sufficient for heating the fuel at high flow rates through the fuel metering unit, for example during stages when the aircraft is taking off or climbing.

Unfortunately, the units constituted by the bypass control valve, the fuel metering unit, and the combustion injectors of the engine may be sensitive to icing of the fuel.

In order to make the bypass control valve less sensitive to icing of the fuel, it is known to have resort to a servo-controlled valve with a large force margin and with a heated pressure difference detector at the terminals of the valve. Combustion injectors can generally operate for a significant length of time under icing conditions before leading to malfunction of the engine. This time is generally longer than the duration of the portion of the mission in which fuel is to be found under icing conditions.

In contrast, the fuel metering unit is a unit that it is difficult to make insensitive to icing of the fuel, in particular when the fuel metering unit is provided with a metering slot having a flow passage of profile that is exponential. Such a fuel metering unit has the advantage of making it possible to obtain high accuracy in the metering of fuel at low flow rates. However, when it is supplied with fuel under icing conditions, the narrow portion of the metering slot tends to become partially clogged because of particles of ice building up therein. More specifically, this partial clogging typically appears for high flow rates in the narrow portion of the slot (when the fuel is at a negative temperature). The result of this is that when returning to low flow rates after operating with a high flow rate (typically when returning to an idling stage of the engine), there exists a non-negligible risk that the injected fuel flow rate becomes less than the limit set by the burn-out limit, and therefore there is a risk of flame-out in the combustion chamber of the engine.

Published patent application FR 2 825 120 A1 discloses a fuel metering unit provided with a metering slot having a flow passage of profile that is exponential, the metering unit being of cylindrical shape with a movable element in the form of a piston. The metering slot is split into two portions that are circumferentially spaced apart from each other and that are separated by sealing means, so as to produce an outlet for low flow rates that is separated from the outlet for high flow rates. The outlet dedicated to low flow rates corresponds to the narrow portion of the slot, while the outlet dedicated to high flow rates corresponds to the wider portion of the slot. Such a device is particularly suitable for limiting over-speed by shutting only the outlet dedicated to high flow rates.

However, when supplied with fuel under icing conditions, that known device does not make it possible to prevent the output that is dedicated to low flow rates, i.e. the narrow portion of the slot, becoming partially clogged because of ice particles building up therein.

OBJECT AND SUMMARY OF THE INVENTION

The present invention is therefore mainly directed to overcoming such drawbacks by proposing a fuel metering unit that is tolerant to the icing of fuel.

This object is achieved by means of a fuel metering unit able to operate under icing conditions of the fuel, comprising a movable element including at least one fuel flow section opening upstream towards a fuel supply duct and opening downstream towards a utilization duct through a metering slot with a flared profile having a narrow flow section and a wide flow section, the movable element being able to be moved relatively to a stationary element only over a predetermined stroke between a low flow rate position in which the metering slot is for a large part obstructed and a high flow rate position in which the metering slot is for a great part exposed, the metering slot being made in the stationary element or in the movable element and its obstruction being obtained by covering the slot with a wall of the movable element or of the stationary element. According to the invention, the metering unit further includes obstruction means for obstructing at least partly the narrow flow section of the metering slot when the metering unit is in a high flow rate position, without ever obstructing the wide flow section of said metering slot.

At a low flow rate, the fuel is typically at a positive temperature, so that the risk of clogging the metering slot of the metering unit (by build up of ice particles) is inexistent. At a high flow rate, the fuel is on the contrary at a negative temperature, which causes the formation of ice particles in the fuel. In this high flow rate position, the metering slot of the metering unit according to the invention is obstructed in its narrowest flow section, which gives the possibility of avoiding ice particles building up therein (since the remainder of the metering slot is wider, ice particles are not capable of building up therein). When the fuel flow rate of the metering unit returns from this high flow rate position to its low flow rate position, the narrowest portion of the metering slot that becomes the only flow section for the fuel is therefore not obstructed, while the oil fuel thermal balance gives the possibility of leaving the icing conditions, which gives the possibility of avoiding any risk of extinction of the combustion chamber of the engine. Moreover, the obstruction means are shaped so that they never obstruct any portion of the wide flow section of the metering slot, whatever the position of the metering unit.

Any risk of clogging the metering slot of the fuel metering unit according to the invention may be avoided without however affecting the operation of the fuel metering unit. In other words, the invention gives the possibility of avoiding clogging of the narrow flow section of the metering slot which occurs at a high flow rate and of finding again at a low flow rate a correlation between the flow rate and the position of the metering unit that is not affected by the icing.

According to a first embodiment, the metering slot is made in the stationary element and opens into the fuel flow section via an opening made in the movable element and longitudinally delimited between a main edge and a secondary edge, said opening having a shorter length than a length of the metering slot and being able to move facing the latter so as to at least partly obstruct the narrow flow section of the metering slot when the metering unit is in the high flow rate position.

In this first embodiment, the stationary element may form a bushing which comprises a window opening upstream towards the fuel supply duct and opening into the fuel flow section, said window being longitudinally shifted with respect to the metering slot.

In this case, advantageously, the movable element forms a slider able to longitudinally slide in the bushing, and the secondary edge is formed by a shoulder protruding into the fuel flow section between two end faces of the slider. This shoulder may be an element added on the slider (which makes the invention easily adaptable to existing fuel meters).

According to a second embodiment, the stationary element comprises a window opening upstream towards the fuel supply duct and opening into the fuel flow section, said window being alternatively longitudinally aligned with the metering slot.

According to a third embodiment, the stationary element further comprises an orifice opening into the fuel flow section and opening towards a utilization duct, said orifice being obstructed by the secondary edge of the opening of the movable element when the latter is in a high flow rate position and exposed when it is in the low flow rate position.

In this case, the secondary edge of the opening of the movable element may advantageously have a profiled profile so as to allow obstruction of the orifice as soon as the narrow flow section of the metering slot begins to be obstructed. Further, in an alternative embodiment, the stationary element may further comprise an orifice opening towards a utilization duct, and the movable element may comprise an additional opening through which the fuel flow section opens towards the utilization duct, said additional opening being able to be moved facing said orifice so as to be able to obstruct it when the metering unit is in the high flow rate position.

According to a fourth embodiment, the metering slot is made in the movable element facing the fuel flow section and opens towards the utilization duct via an opening made in the stationary element and longitudinally delimited between a main edge and a secondary edge, said opening of the stationary element having a shorter length than a length of the metering slot and the metering slot being able to move facing the opening so that at least one portion of the narrow flow section of the metering slot is obstructed when the metering unit is in the high flow rate position.

In this fourth embodiment, the stationary element may comprise a window opening upstream towards the fuel supply duct and opening into the fuel flow section, said window being longitudinally shifted with respect to the opening.

The movable element may include at least two end faces and said at least one fuel flow section is located between said end faces.

The metering slot may have a narrow flow section that flares to a wide flow section.

The narrow flow section of the metering slot may possess a width having a maximum lying in the range 0.5 mm to 1 mm.

In a fifth embodiment, the narrow flow section and the wide flow section of the metering slot form two disjoint portions leading respectively to a low flow rate utilisation duct and to a high flow rate utilisation duct.

In this fifth embodiment, the movable element and the stationary element may respectively be in the form of a piston and of a cylinder, the two disjoint portions of the metering slot being formed in the stationary element, the metering unit having a second metering slot in which the narrow flow section and the wide flow section likewise form two disjoint portions formed in the stationary element, the narrow flow section and the wide flow section of the first metering slot being diametrically opposite relative to the narrow flow section and the wide flow section respectively of the second metering slot.

The object of the invention is also a fuel supply circuit of an aircraft engine, including a low pressure pumping system connected to a high pressure pumping system and a fuel metering unit as defined earlier for which the fuel flow section opens in the downstream direction towards combustion chamber injectors of the engine.

BRIEF DESCRIPTION OF THE DRAWINGS

Other features and advantages of the present invention become apparent from the description made below, with reference to the appended drawings that illustrate exemplary embodiments thereof, without any limitation. In the figures.

DETAILED DESCRIPTION OF THE INVENTION

A fuel metering unit according to the invention is described hereafter within the scope of an application to a fuel supply circuit of an airplane gas turbine engine. However, the field of application of the invention extends to fuel supply circuits of other aircraft, notably helicopters and to aircraft engines other than a gas turbine.

Figure 1:
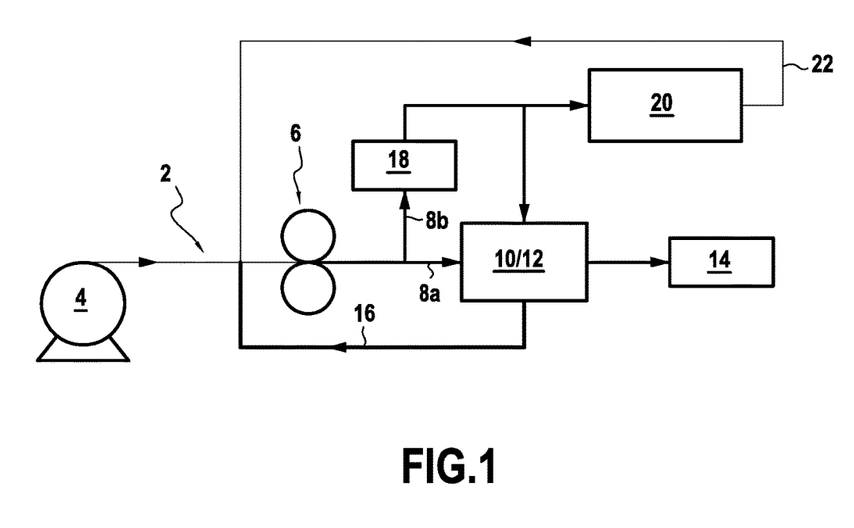
FIG. 1 is a schematic view of a fuel supply circuit of an aircraft engine to which the invention is applied.

The fuel supply circuit 2 illustrated in FIG. 1 typically includes a low pressure pumping system 4 connected upstream to a fuel tank (not shown) of the aircraft and associated downstream with a high pressure pump 6 that is generally driven by the engine via an accessories gear box (or AGB, not shown in FIG. 1).

Downstream from the high pressure pump 6, the fuel supply circuit 2 is separated into two branches 8a, 8b. One of the branches 8a comprises a bypass control valve 10 and a fuel metering unit 12 giving the possibility of regulating the fuel flow feeding the combustion injectors 14 of the engine, and sending the excess fuel into the circuit upstream from the high pressure pump 6, via a recycling loop 16.

The other branch 8b comprises a heat exchanger 18 and sends the fuel towards variable-geometry actuators 20 of the engine (for example air discharge valves or vanes with variable pitch angle). The fuel used is sent back upstream from the high pressure pump 6, via another recycling loop 22.

The stationary and movable elements of the metering unit, object of this invention, may assume different shapes, such as sheaths, sliders, butterfly valve elements, plates in rotation or in translation, etc. In order to explain the design of the invention, for which the application is not limited to this sole shape, the metering unit that is described below, comprises a slider as a movable element and a bushing as a stationary element.

FIGS. 2A-2B and 3A-3B schematically illustrate a fuel metering unit 12-1 according to a first embodiment of the invention that may be used for the fuel supply circuit 2 described earlier.

In a way known per se, the fuel metering unit 12-1 comprises a slider 22 that may slide inside a bushing 24, for example a cylindrical bushing. The slider 22 comprises two end faces 26, 28 that may divide the internal volume of the bushing 24 into two control chambers 30a, 30b that are located at both ends of the bushing, and into at least one fuel flow section 32 that is located between the end faces 26, 28. The control chambers 30a, 30b are connected through control lines to a servo-valve (not shown) that gives the possibility of controlling a displacement of the slider inside the bushing. Of course, other actuation modes of the slider of the metering unit may be contemplated (for example electric actuation).

Moreover, the fuel flow section 32 of the metering unit opens upstream towards a fuel supply duct (connected to the first branch 8a of the fuel supply circuit) and opens downstream towards a utilization duct (connected to the combustion injectors 14 of the engine). Of course, the fuel flow section of the metering unit may open downstream towards several independent utilization ducts, as well as the metering unit may comprise several fuel flow sections opening towards different utilization ducts.

More specifically, the fuel flow section 32 opens towards the utilization duct via a metering slot 34 said to be "with an increasing, for example exponential profile", i.e. a metering slot that has a narrow flow section 34a flaring according to a flare profile, for example of exponential shape, as far as a wider flow section 34b. This type of metering slot gives the possibility of ensuring the required metering accuracy for the operation of the engine over the whole of the flow rate range.

In the first embodiment of FIGS. 2A-2B and 3A-3B, the metering slot 34 is made in the bushing 24 and opens into the fuel flow section 32 of the metering unit via an opening 36 made in the slider and longitudinally delimited between a main edge 38 and a secondary edge 40.

The main edge 38 is here formed with an extension of one of the end faces 28 of the slider, while the secondary edge 40 is formed by a shoulder protruding in the flow section 32 of the fuel metering unit between both end faces 26, 28 of the slider. This secondary edge 40 is positioned so as to delimit with the main edge an opening 36 that has a shorter length L1 than the length L2 of the metering slot 34 (the length of the metering slot being measured between its narrow flow section 34a and its wide flow section 34b). Thus, upon sliding the slider inside the bushing, the opening 36 moves facing the metering slot 34.

The bushing 24 also comprises a window 39 which opens upstream towards the fuel supply duct and which opens into the fuel flow section 32, this window 39 being longitudinally shifted with respect to the metering slot 34.

The operation of such a fuel metering unit 12-1 is the following. In the position of low (or small) flow rate (FIGS. 2A-2B), the slider 22 of the fuel metering unit slides (on a command from the servo-valve) inside the bushing 24 so that the metering slot 34 is for a great part obstructed by a wall portion of the slider extending from the main edge 38 towards the end face 28 of the slider (i.e. only the narrow flow section 34a of the metering slot is exposed and allows the fuel to pass from the fuel flow section 32 to the utilization duct, the remainder of the metering slot being masked by said wall portion of the slider).

Figure 2A:
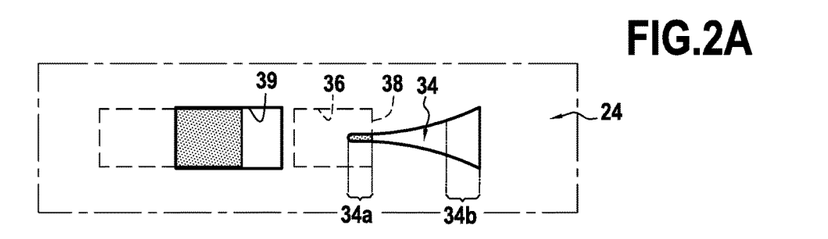
FIGS. 2A-2B and 3A-3B illustrate schematically a fuel metering unit according to a first embodiment of the invention in its low flow rate position and high flow rate position respectively.
Figure 2B:
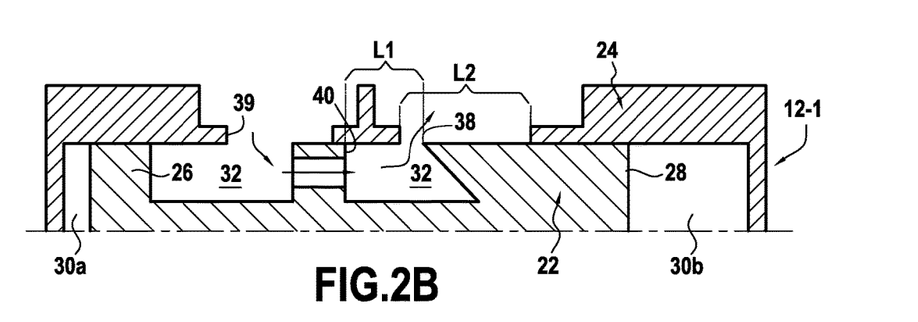

In this low flow rate position, it should also be noted that the window 39 made in the bushing 24 and opening upstream towards the fuel supply duct is partly obstructed by the shoulder forming the secondary edge 40 of the slider of the metering unit.

When the servo-valve orders the fuel metering unit to position itself for a high flow rate (FIGS. 3A-3B), the slider of the fuel metering unit slides inside the bushing 24 so that the metering slot 34 is for a great part exposed (i.e. only the narrow flow section 34a of the metering slot is masked by the shoulder forming the secondary edge 40 of the slider, the remainder of the metering slot being exposed and allowing passing of the fuel from the fuel flow section 32 to the utilization duct).

Figure 3A:
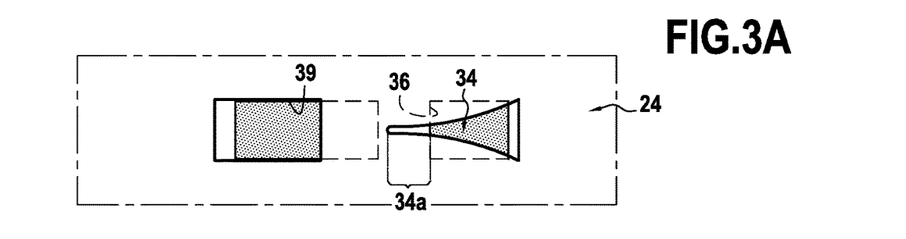
Figure 3B:
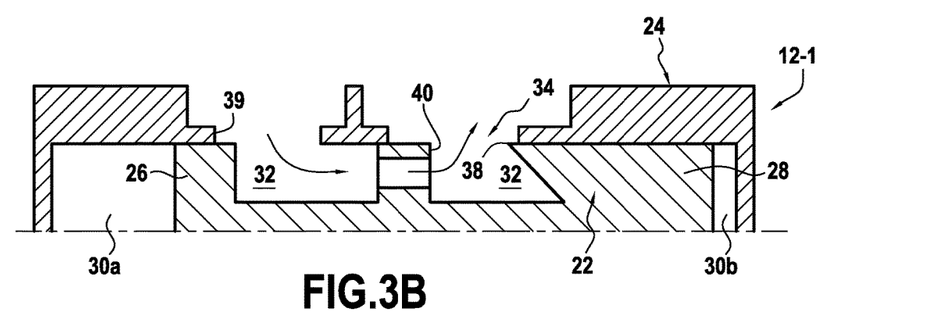

More specifically, in this high flow rate position, the shoulder forming the secondary edge 40 of the slider of the fuel metering unit masks the narrow flow section 34a of the metering slot in order to avoid any passing of fuel through this portion of the metering slot.

The displacement of the slider is preferably provided so that the main edge 38 of the opening 36 made in the slider never reaches the position of the end edge of a larger width of the metering slot 34, this end edge of the slot therefore remains masked by the main edge 38. In other words, in an end position of the slider corresponding to the maximum flow rate, a small space is provided in the axial direction between the main edge 38 and this end edge of the metering slot 34. Indeed, it is important that the system for regulating the flow may control the maximum flow in the end position of the slider, i.e. notably so that the regulation system may further increase to some extent this maximum flow rate by driving the slider slightly beyond its end position. In other words, this end position of the slider is not an end-of-stroke abutment position of the slider, since such an abutment position would imply loss of control by the flow rate regulation system. It may be considered that this extreme end position is a quasi end-of-stroke position of the slider.

Accordingly, any risk of ice particles from the icing of the fuel building up in the narrow flow section of the metering slot is avoided. In this way, when the fuel metering unit passes again from this high flow rate position to the low flow rate position of FIGS. 2A-2B where only the narrow flow section 34a of the metering slot is exposed, the passing of fuel through this flow section is not perturbed by ice particles building up.

It should also be noted that in this high flow rate position, the window 39 made in the bushing 24 and opening upstream towards the fuel supply duct is no longer obstructed by the shoulder forming the secondary edge 40 of the slider of the metering unit.

It should further be noted that the shoulder forming the secondary edge 40 of the slider of the fuel metering unit (which masks the narrow flow section 34a of the metering slot in the high flow rate position) may be an added element or form a single and same part with the slider 22 of the fuel metering unit.

FIGS. 4A-4B and 5A-5B schematically illustrate a fuel metering unit 12-2 according to a second embodiment of the first embodiment.

This second embodiment is distinguished from the first embodiment of the invention by the way how are laid out the fuel supply duct and the utilization duct. Relatively to the embodiment described earlier where these ducts open into the metering unit on a same "side" of the bushing while being longitudinally shifted relatively to each other, these ducts are here longitudinally aligned with each other and open into the metering unit along two opposite sides, respectively an upstream side and a downstream side, thereof.

In this configuration, the fuel flow section 32' is central and opens in the upstream direction into the fuel supply duct and in the downstream direction into the utilization duct, these ducts being aligned with each other. For this purpose, the bushing 24 comprises a window 42 which opens upstream towards the fuel supply duct and which is longitudinally aligned with the metering slot 34 (i.e. the orthogonal projections of the metering slot and of the window 42 on the longitudinal axis of the metering unit substantially coincide). The slider 22 also comprises an opening 39' that permanently opens into the flow section 32' regardless of the position of the slider.

Figure 4A:
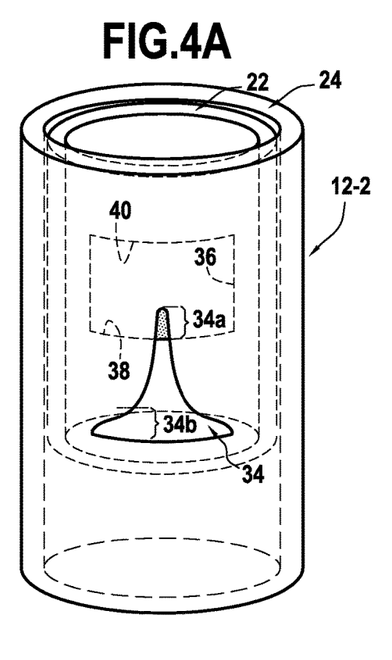
FIGS. 4A-4B and 5A-5B represent a fuel metering unit according to a second embodiment of the invention in its low flow rate and high flow rate position, respectively.
Figure 4B:
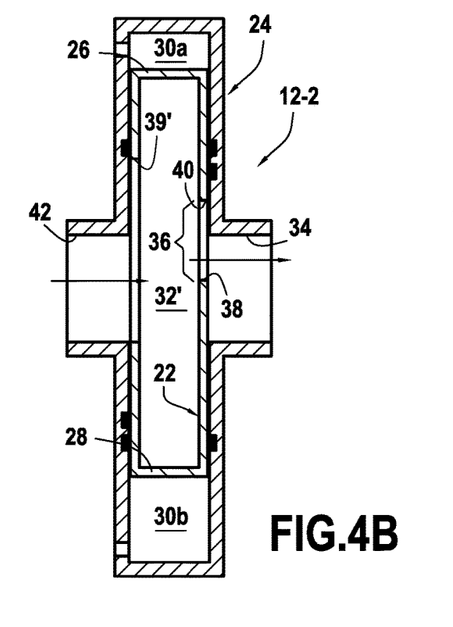
Figure 5A:
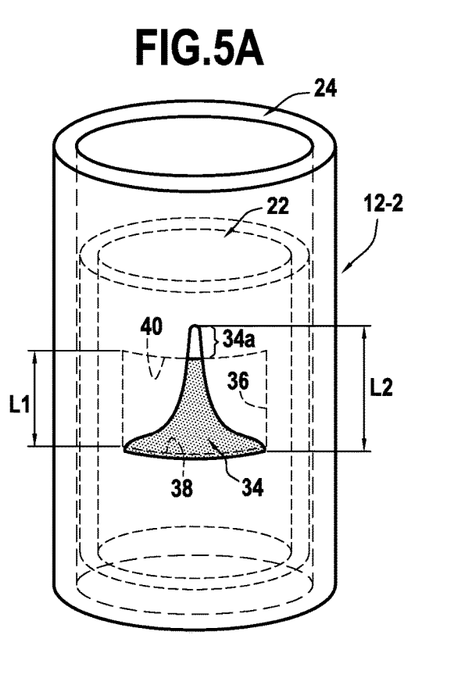
Figure 5B:
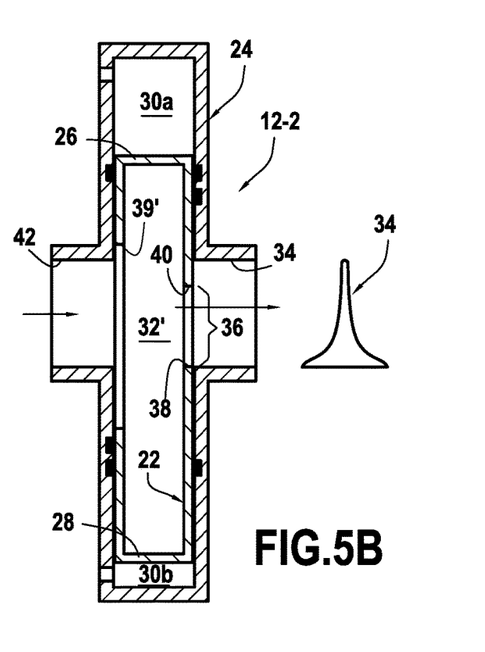

It should be noted that the perspective illustrations of the fuel metering unit 12-2 in FIGS. 4A and 5A only illustrate the downstream side of the metering unit, so that the opening 39' of the slider and the window 42 of the bushing located on the upstream side are not illustrated.

Still in this second embodiment, the metering slot 34 opens into the fuel flow section 32' of the metering unit via the opening 36 made in the slider 22 and longitudinally delimited between a main edge 38 and a secondary edge 40.

The main edge 38 is here formed by an edge of a wall of the slider in the extension of one of the end faces 28 of the slider, while the secondary edge 40 is formed by the extension of the other end face 26 of the slider. The secondary edge 40 is also positioned so as to delimit with the main edge an opening 36 that has a shorter length L1 than the length L2 of the metering slot 34.

The longitudinal alignment of the window 42 of the bushing with the metering slot 34 is not indispensable here. Indeed, it is possible for example to provide that the section of the fuel supply duct has a size different from that of the utilization duct, along the longitudinal direction and/or the circumferential direction of the metering unit.

The operation of the fuel metering unit 12-2 according to this second embodiment is similar to the one described earlier.

In the low flow rate position (FIGS. 4A-4B), the slider 22 of the fuel metering unit 12-2 slides inside the bushing 24 so that the metering slot 34 is for a large part obstructed by a wall portion of the slider extending from the main edge 38 to the end face 28 of the slider (only the narrow flow section 34a of the metering slot is exposed, the remainder of the metering slot being masked by said wall portion of the slider).

In the high flow rate position (FIGS. 5A-5B), the slider 22 of the fuel metering unit slides so that the metering slot 34 is for a large part exposed (i.e. only the narrow flow section 34a of the metering slot is masked by a wall portion of the slider extending from the secondary edge 40 to the end face 26 of the slider, the remainder of the metering slot being exposed and allowing passing of the fuel from the fuel flow section 32 to the utilization duct). Thus, in this high flow rate position, any risk of ice particles from the icing of the fuel building up in the narrow flow section 34a of the metering slot is avoided.

In connection with FIGS. 6, 7A-7B and 8A-8B, a fuel metering unit 12-3 according to a third embodiment of the invention is described below.

This third embodiment is distinguished from the second embodiment in that the bushing 24 further comprises an orifice 44 opening into the fuel flow section 32' and opening towards the utilization duct. This orifice 44 typically allows adjustment of the regulation of the minimum flow rate of fuel delivered by the metering unit towards the utilization duct.

Figure 8A:
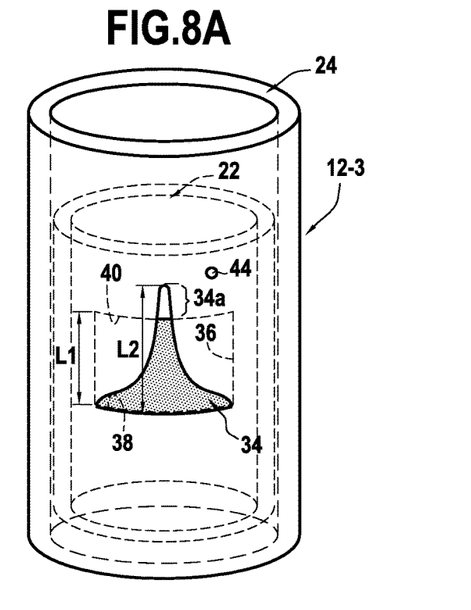
Figure 8B:
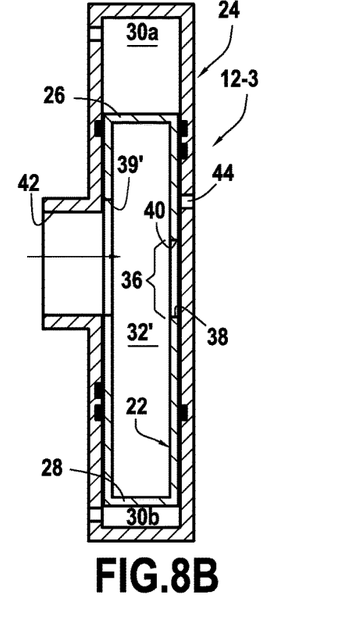

The orifice 44 is positioned on the bushing 24 so as to be exposed when the slider is in the small flow rate position (FIG. 6) and with moderate flow rate (i.e. between the low and high flow rate—FIGS. 7A-7B), and obstructed by the secondary edge 40 of the opening 36 of the slider 22 when the slider is in the high flow rate position (FIGS. 8A-8B).

Thus, in the high flow rate position, any risk of ice particles from the icing of the fuel building up in the narrow flow section 34a of the metering slot 34 and in the orifice 44 is avoided.

Moreover, in this exemplary embodiment, when the fuel metering unit passes from the low flow rate position to the high flow rate position, the orifice 44 becomes obstructed a little before the obstruction of the narrow flow section 34a of the metering slot by the secondary edge.

Figure 9A:
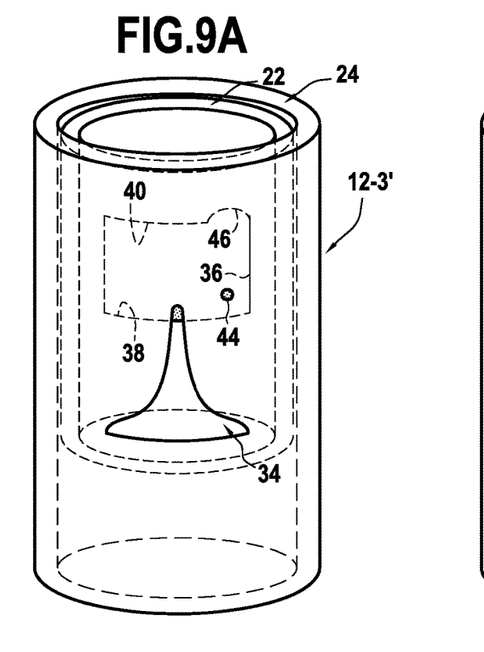
Figure 9B:
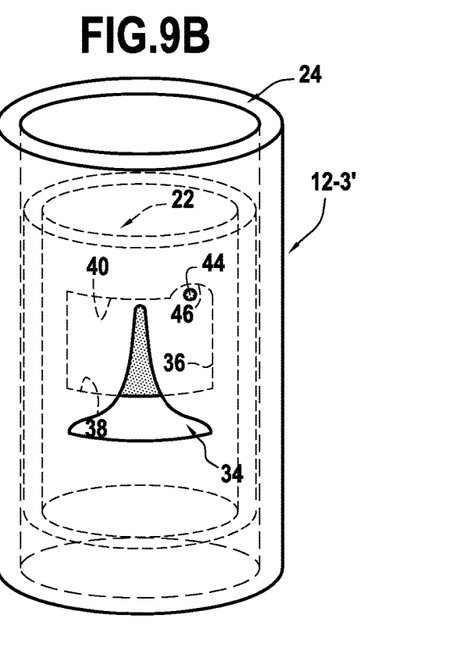
Figure 9C:
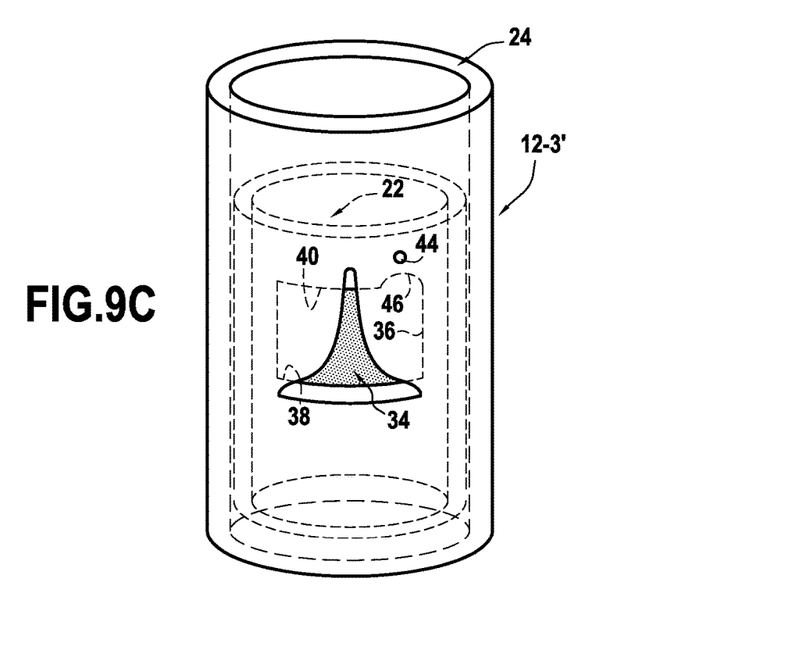
Figure 10A:
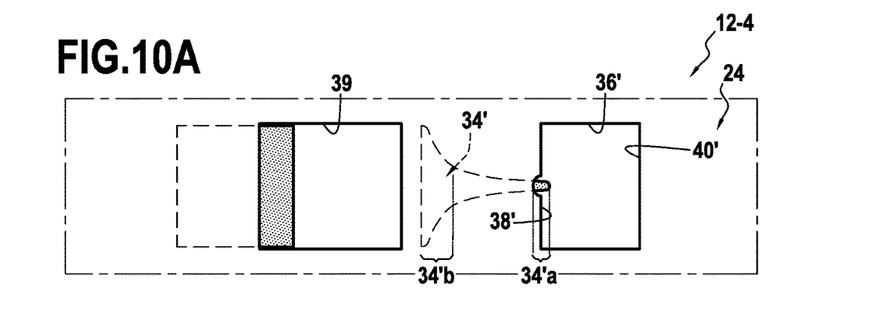
FIGS. 10A-10B and 11A-11B schematically illustrate a fuel metering unit according to a fourth embodiment of the invention in its low flow rate and high flow rate position, respectively.
Figure 10B:
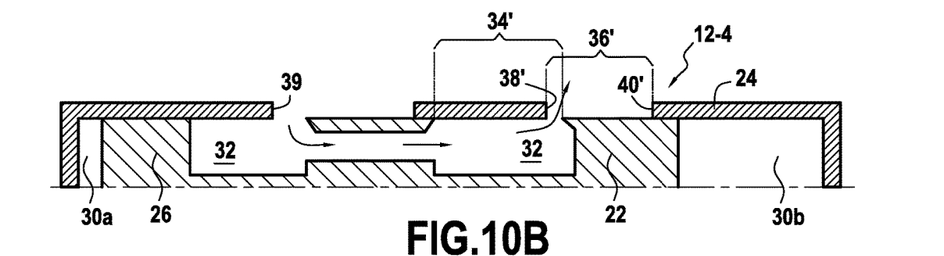
Figure 11A:
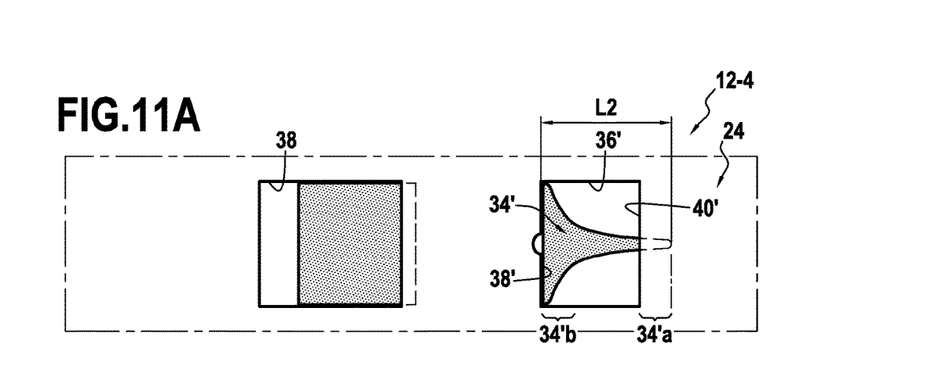
Figure 11B:
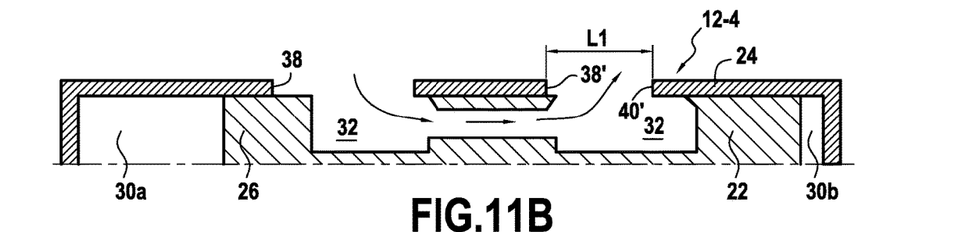

In an alternative embodiment of this third embodiment illustrated in FIGS. 9A to 9C, the secondary edge 40 of the opening 36 of the slider 22 of the metering unit 12-3' has a profiled profile 46 so as to allow obstruction of the orifice 44 as soon as the narrow flow section 34a of the metering slot 34 begins to be obstructed by the secondary edge.

Thus, FIG. 9A illustrates the metering unit 12-3' in a small flow rate position in which both the narrow flow section 34a of the metering slot 34 and the orifice 44 are exposed so as to allow adjustment of the minimum fuel flow rate towards the utilization duct. In the moderate flow rate position of FIG. 9B, the orifice 44 remains exposed while the metering slot is exposed. Finally, in order to reach the high flow rate position, the orifice 44 is obstructed by the secondary edge 40 as soon as the narrow flow section 34a of the metering slot 34 begins to be obstructed by said secondary edge (see FIG. 9C for example illustrating 80% of the high flow rate).

In an alternative (not shown in the Figures) of this third embodiment, the slider of the fuel metering unit comprises an additional opening (independent of the opening 36 described earlier) through which the fuel flow section is able to open towards a utilization duct via the orifice for adjusting the minimum fuel flow rate. This additional opening is able to be moved facing said orifice so as to be able to obstruct it when the slider is in the high flow rate position.

In connection with FIGS. 10A-10B and 11A-11B, a fuel metering unit 12-4 according to a fourth embodiment of the invention is described below.

The fuel metering unit 12-4 of this fourth embodiment of the invention is distinguished from those described earlier notably in that the metering slot 34' is made in the slider 22 (and not in the bushing 24) facing the fuel flow section 32 and opens towards the utilization duct via an opening 36' made in the bushing 24 (and not in the slider) and longitudinally delimited between a main edge 38' and a secondary edge 40'.

The main edge 38' and the secondary edge 40' are here formed by edges of the bushing 24 longitudinally delimiting the opening 36', the latter having a length L1 (between the edges 38', 40') that is shorter than the length L2 of the metering slot 34' (between its narrow flow section 34'a and its wide flow section 34'b). Thus, upon sliding the slider 22 inside the bushing 24, the metering slot 24' moves facing the opening 36'.

The bushing 24 also comprises a window 39 opening upstream towards the fuel supply duct and opening into the fuel flow section 32, this window 39 being longitudinally shifted with respect to the opening 36'.

Figure 6:
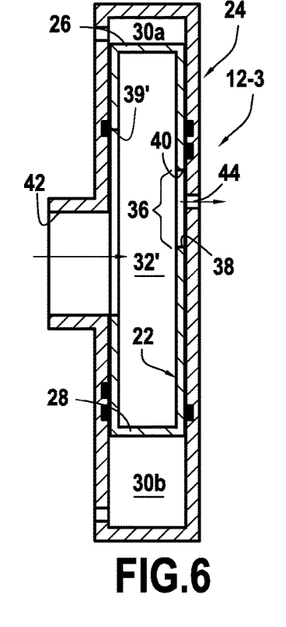
FIGS. 6, 7A-7B, 8A-8B and 9A-9B-9C illustrate a fuel metering unit according to a third embodiment of the invention in different positions.
Figure 7A:
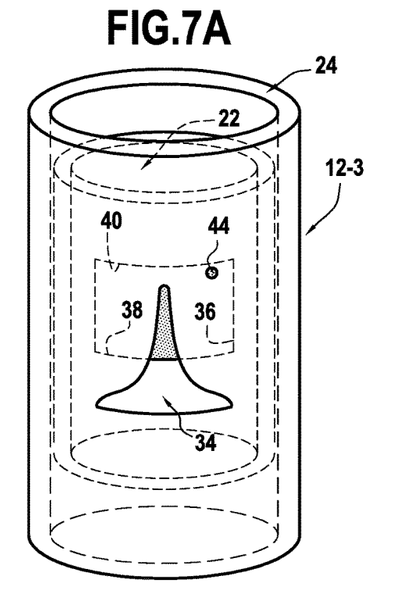
Figure 7B:
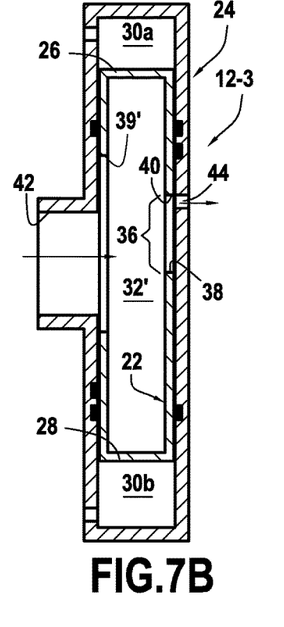

The operation of the fuel metering unit 12-4 according to this fourth embodiment is the following. In the low flow rate position (FIGS. 6A-6B), the slider 22 of the fuel metering unit slides inside the bushing 24 so that the metering slot 34' is for a large part obstructed by a wall portion of the bushing extending from the main edge 38' of the opening 36' of the bushing towards the window 39 (only the narrow flow section 34'a of the metering slot is exposed and allows fuel to pass from the fuel flow section 32 to the utilization duct).

In the high flow rate position (FIGS. 10A-10B), the slider of the fuel metering unit slides inside the bushing 24 so that the metering slot 34' is for a large part exposed (only the narrow flow section 34'a of the metering slot is masked by the secondary edge 40' of the opening 36' of the bushing, the remainder of the metering slot being exposed and allows the fuel to pass from the fuel flow section 32 to the utilization duct).

In this high flow rate position, the edge of the opening 36' of the bushing forming the secondary edge 40' masks the narrow flow section 34'a of the metering slot in order to avoid passing any fuel through this portion of the metering slot, and as to avoid any ice particles from the icing of the fuel building up therein. In this way, when the fuel metering unit 12-4 again passes from this high flow rate position to the low flow rate position of FIGS. 6A-6B where only the narrow flow section 34'a of the metering slot 34' is exposed, the passing of fuel through this flow section is not perturbed by any ice particle.

Regardless of the embodiment of the fuel metering unit according to the invention, it should be noted that the shape of the cut out of the metering slot 34, 34' is adapted so as to widely compensate at a high flow rate for it being partially shut by the secondary edge 40, 40' at the narrow flow section 34a, 34'a of the metering slot. An exponential-shaped profile for the metering slot is as such particularly adapted for this result, since at a high flow rate, a small displacement of the slider towards the maximum flow rate position substantially increases the exposed section of the metering slot, the flow rate gained on the side of the wide flow section of the metering slot during this small displacement of the slider being much more significant than the flow rate lost on the side of the narrow flow section.

It is understood that the application of the invention is not limited to the embodiment of a metering unit with a slider and bushing as described in the foregoing. The invention also applies to most of the other known architectures of fuel metering units with variable geometrical aperture, i.e. using a window for passing of fuel and a metering opening also called a slot, the window and the slot being displaceable relatively to each other so as to vary the section of the aperture defined by the superposition of both elements.

From among these other known architectures, mention may notably be made of metering units with rotary pipes, in which the fuel passage window is made in a cylinder that may be moved in rotation relatively to its axis, the metering opening being made in a partly cylindrical stationary wall that is radially superposed to the rotary cylinder. Mention may also be made of metering units with a sliding or rotary plate, in which the fuel passage window is made in a movable plate in translation or in rotation, the metering opening being made in a stationary plate also called a counter-plate that is superposed to the movable plate along an axial direction corresponding to the direction of flow of the fuel.

By providing that the fuel passage window has an either axial or circumferential length, depending on the architecture of the metering unit, substantially less than the length of the metering opening (slot), it is possible to mask the narrow portion of the metering opening while the largest portion of the section of the opening is exposed by the window. This arrangement thus allows the narrow portion of the slot to be protected against formation of ice in the case of icing of the fuel while ensuring a high fuel flow rate.

Figure 12:
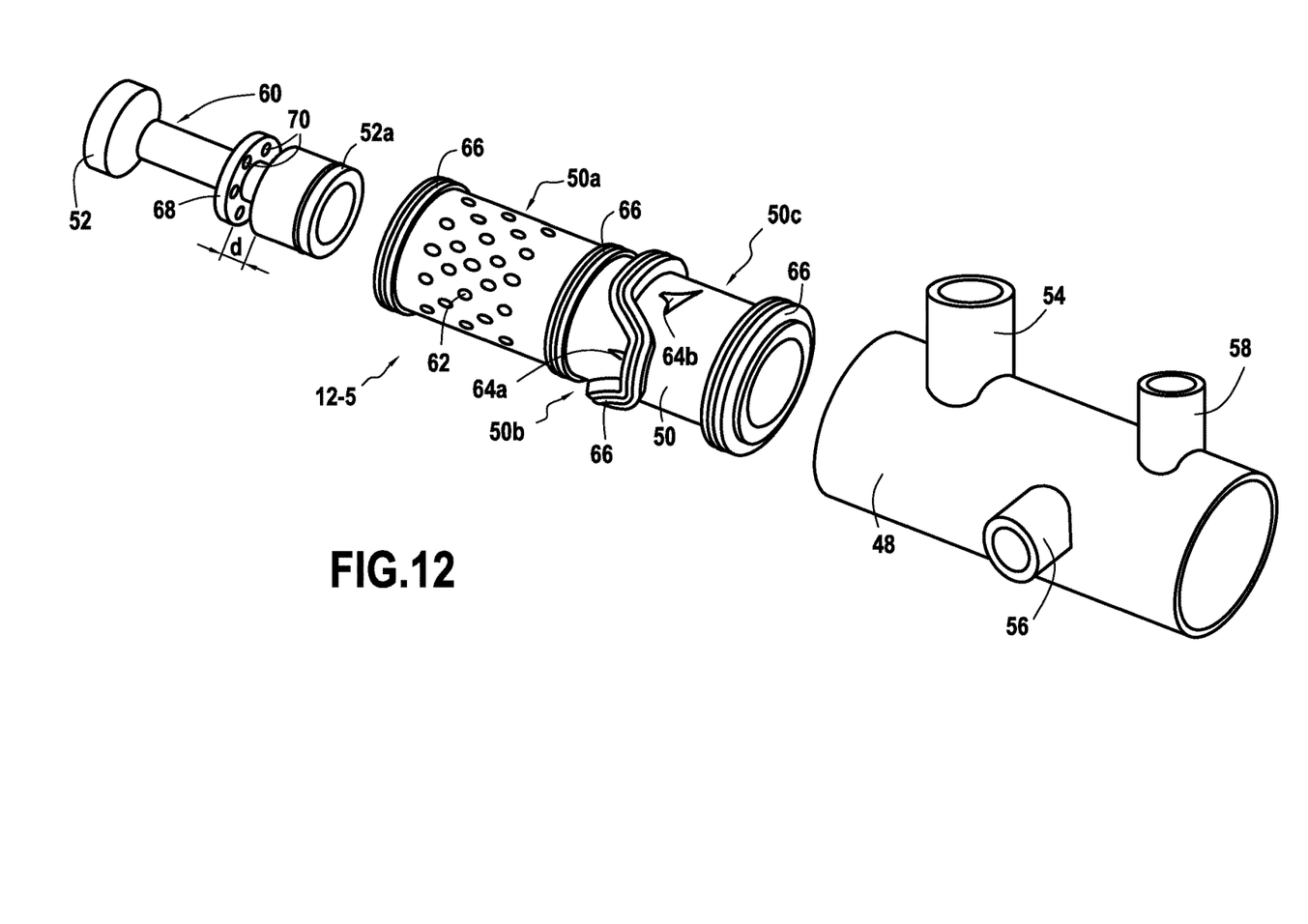
FIG. 12 is a perspective exploded view showing a fuel metering unit in a fifth embodiment of the invention.

With reference to FIG. 12, there follows a description of a fuel metering unit 12-5 in a fifth embodiment of the invention.

This fuel metering unit is similar to that described in publication FR 2 825 120 A1, the content of which is incorporated herein by way of reference.

This fuel metering unit 12-5 comprises a cylindrical outer envelope 48 having mounted therein a cylinder 50 forming a manifold. In this stationary cylinder 50, there is mounted a piston 52 that can move axially in continuous manner between two extreme positions.

The outer envelope 48 has a fuel feed duct 54 and two utilisation ducts, namely a utilisation duct 56 for injecting fuel at low flow rates, and a utilisation duct 58 for injecting fuel at high flow rates.

The piston 52 includes an annular opening 60 forming a distribution chamber for metering fuel. By way of example, movement of the piston in the cylinder 50 may be actuated by an electromagnetic element.

The cylinder 50 has a plurality of zones for distributing fuel: a first zone 50a for co-operating with the inlet orifice 54 to receive fuel and having a plurality of feed orifices 62;

a second zone 50b for co-operating with the utilisation duct 56 serving for injecting fuel at low rates and having at least one narrow flow section 64a of a metering slot; and a third zone 50c for co-operating with the utilisation duct 58 used for injecting fuel at high rates and having at least one wide flow section 64b for the metering slot. The three zones 50a, 50b, and 50c are separated by annular sealing rings 66.

Furthermore, the piston 52 carries a disk 68 arranged within the annular opening 60. The disk 68 is to form obstruction means for obstructing the narrow flow section(s) 64a of the metering slot of the cylinder 50 when the metering unit is in the high rate position. In order to ensure that the disk 68 does not obstruct any portion of the wide flow section(s) 64b of the metering slot, it is axially spaced apart from a corresponding end portion 52a of the piston by a distance d corresponding substantially to the length of the wide flow section 64b. Thus, in the high rate position, all or nearly all of the wide flow section(s) 64b of the metering slot is/are uncovered by the piston 52, being situated radially facing the space provided between the disk 68 and the end portion 52a of the piston. In this high rate position, the annular circumferential wall of the disk 68 obstructs the narrow flow section(s) 64a of the metering slot, at least in part. The thickness of the disk 68 in the axial direction may be designed to be not less than the length of the narrow flow section 64a so as to cover this section completely in the high rate position.

Furthermore, it may be observed that the disk 68 is provided with holes 70 to allow fuel to flow into the opening 60 of the piston. It is possible to envisage any other means for allowing fuel to flow from one side to the other of the obstruction means. For example, instead of a disk, the obstruction means could consist in a sector of a disk, or in two diametrically-opposite sectors of a disk for a metering unit that has a second metering slot. The space(s) not occupied by the sector(s) in the circumferential direction would then constitute passages for fuel.

It should be observed that the narrow flow sections 64a and the wide flow sections 64b of the metering slot in this example form two portions that are mutually disjoint. For this purpose, they may be offset circumferentially from each other, as shown in FIG. 12. In a variant that is not shown, the spacing between the narrow flow section and the wide flow section of the metering slot may be axial, and this axial spacing should generally be greater than the axial length of the wide flow section.

The maximum width of the narrow flow section(s) 64a of the metering slot is preferably equal to the minimum width of the wide flow section(s) 64b of the metering slot. In this manner, the flow of fuel feeding the combustion injectors varies in continuous manner over the predetermined stroke of the piston between the low rate position and the high rate position.

Furthermore, the maximum width of the narrow flow section(s) 64a of the metering slot advantageously lies in the range 0.5 mm to 1 mm. This value is selected in such a manner that particles of ice in fuel at negative temperature do not have the ability to form a bridge between the two edges of the slot beyond this maximum width. This makes it possible to avoid seeing bridges of ice particles appearing in the wide flow section(s) 64b of the metering slot, even in its narrower portion. Particles of ice that have a natural tendency to become attached to the edges of the slot become detached by the flow of fuel passing through the wide flow section 64b, thus ensuring that ice does not build up in this section of the slot.

In other words, in the same manner as in the other embodiments of the invention as described above, the width of the slot that defines the boundary between the narrow flow section and the wide flow section of the metering slot is determined in such a manner that only the narrow flow section can potentially become clogged, at least in part, in icing conditions.

In another variant (not shown), the metering unit has a second metering slot in which the narrow flow section and the wide flow section likewise form two disjoint portions made in the cylinder, the narrow flow section and the wide flow section of the first metering slot being diametrically opposite relative to the narrow flow section and the wide flow section respectively of the second metering slot.

The invention claimed is:

1. A fuel metering unit able to operate under icing conditions of the fuel, comprising a movable element including at least one fuel flow section opening upstream towards a fuel supply duct and opening downstream towards a utilization duct through a metering slot with a flared profile having a narrow flow section and a wide flow section, the movable element being able to be moved relatively to a stationary element only over a predetermined stroke between a low flow rate position in which the metering slot is for a large part obstructed and a high flow rate position in which the metering slot is for a great part exposed, the metering slot being made in the stationary element or in the movable element and its obstruction being obtained by covering the slot with a wall of the movable element or of the stationary element, the metering unit being characterized in that it further includes obstruction means for obstructing at least partly the narrow flow section of the metering slot when the metering unit is in the high flow rate position, without ever obstructing the wide flow section of said metering slot.

2. The metering unit according to claim 1, wherein the metering slot is made in the stationary element and opens into the fuel flow section via an opening made in the movable element and longitudinally delimited between a main edge and a secondary edge, said opening having a shorter length than a length of the metering slot and being able to move facing the latter so as to at least partly obstruct the narrow flow section of the metering slot when the metering unit is in the high flow rate position.

3. The metering unit according to claim 2, wherein the stationary element forms a bushing which comprises a window opening upstream towards the fuel supply duct and opening into the fuel flow section, said window being longitudinally shifted with respect to the metering slot.

4. The metering unit according to claim 3, wherein the movable element forms a slider able to longitudinally slide in the bushing, and the secondary edge is formed by a shoulder protruding into the fuel flow section between two end faces of the slider.

5. The metering unit according to claim 4, wherein the shoulder is an element added on the slider.

6. The metering unit according to claim 2, wherein the stationary element comprises a window opening upstream towards the fuel supply duct and opening into the fuel flow section, said window being alternatively longitudinally aligned with the metering slot with reference to a longitudinal axis of the flow structure.

7. The metering unit according to claim 2, wherein the stationary element further comprises an orifice opening into the fuel flow section and opening towards a utilization duct, said orifice being obstructed by the secondary edge of the opening of the movable element when the latter is in the high flow rate position and exposed when it is in the low flow rate position.

8. The metering unit according to claim 7, wherein the secondary edge of the movable element has a profiled profile so as to allow obstruction of the orifice as soon as the narrow flow section of the metering slot begins to be obstructed.

9. The metering unit according to claim 2, wherein the stationary element further comprises an orifice opening towards a utilization duct, and the movable element comprises an additional opening through which the fuel flow section opens towards the utilization duct, said additional opening being able to be moved facing said orifice so as to be able to obstruct it when the metering unit is in the high flow rate position.

10. The metering unit according to claim 1, wherein the metering slot is made in the movable element facing the fuel flow section and opens towards the utilization duct via an opening made in the stationary element and longitudinally delimited between a main edge and a secondary edge, said opening having a shorter length than a length of the metering slot and the metering slot being able to be moved facing the opening so that at least one portion of the narrow flow section of the metering slot is obstructed when the metering unit is in the high flow rate position.

11. The metering unit according to claim 10, wherein the stationary element comprises a window opening upstream towards the fuel supply duct and opening into the fuel flow section, said window being longitudinally shifted with respect to the opening.

12. The metering unit according to claim 1, wherein the movable element includes at least two end faces and said at least one fuel flow section is located between said end faces.

13. The metering unit according to claim 1, wherein the narrow flow section of the metering slot flares to the wide flow section.

14. The metering unit according to claim 1, wherein the narrow flow section of the metering slot possesses a width having a maximum lying in the range 0.5 mm to 1 mm.

15. The metering unit according to claim 1, wherein the narrow flow section and the wide flow section of the metering slot form two disjoint portions leading respectively to a low flow rate utilisation duct and to a high flow rate utilisation duct.

16. The metering unit according to claim 15, wherein the movable element and the stationary element are respectively in the form of a piston and of a cylinder, the two disjoint portions of the metering slot being formed in the stationary element, the metering unit having a second metering slot in which the narrow flow section and the wide flow section likewise form two disjoint portions formed in the stationary element, the narrow flow section and the wide flow section of the first metering slot being diametrically opposite relative to the narrow flow section and the wide flow section respectively of the second metering slot.

17. A fuel supply circuit of an aircraft engine, including a low pressure pumping system connected to a high pressure pumping system, and a fuel metering unit according to claim 1 for which the fuel flow section opens in the downstream direction towards combustion chamber injectors of the engine.

* * * * *